No. 718,540. PATENTED JAN. 13, 1903.
J. J. SMITH.
FEED TROUGH.
APPLICATION FILED AUG. 15, 1902.
NO MODEL.
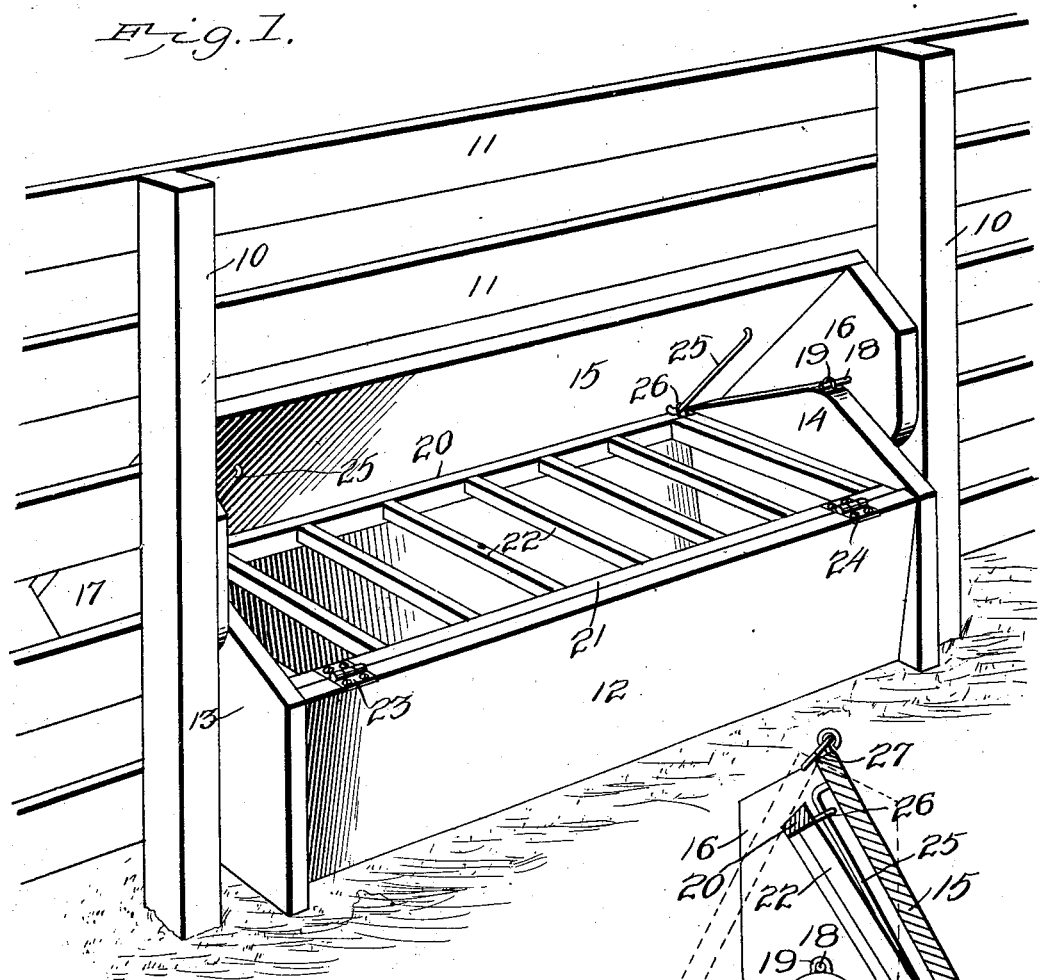
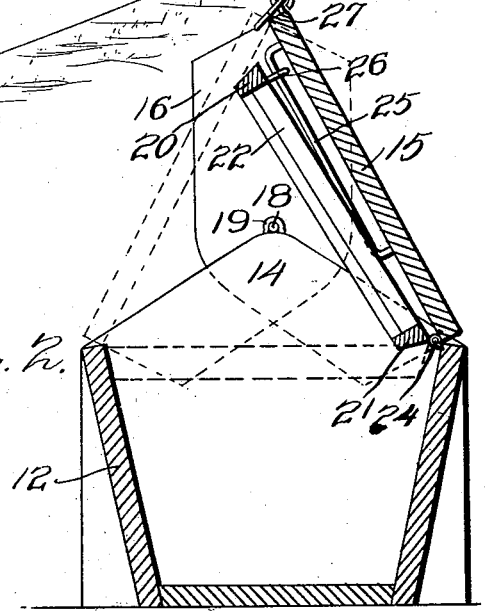
Witnesses
E. F. Stewart
C. H. Woodward
James J. Smith, Inventor.
by C. A. Snow & Co.
Attorneys

UNITED STATES PATENT OFFICE.

JAMES J. SMITH, OF MARSHALL, OKLAHOMA TERRITORY, ASSIGNOR OF ONE-HALF TO JOHN R. CONKLIN, OF MARSHALL, OKLAHOMA TERRITORY.

FEED-TROUGH.

SPECIFICATION forming part of Letters Patent No. 718,540, dated January 13, 1903.

Application filed August 15, 1902. Serial No. 119,806. (No model.)

*To all whom it may concern:*

Be it known that I, JAMES J. SMITH, a citizen of the United States, residing at Marshall, in the county of Logan and Territory of Oklahoma, have invented a new and useful Feed-Trough, of which the following is a specification.

This invention relates to devices employed for the purpose of feeding animals, more particularly swine, sheep, and similar-sized animals, but which may be employed for feeding any of the various species of animals, and has for its object the production of a device preferably located within or forming a portion of a fence and adapted to be closed while the feed is being placed therein; and the invention consists in certain novel features of construction, as hereinafter shown and described, and specified in the claims.

In the drawings illustrative of the invention, Figure 1 is a perspective view of the device from the feed side. Fig. 2 is a transverse section with the shield or cover reversed or with the device arranged in position to receive the feed.

The device will be preferably located between the adjacent posts of a fence, the posts being represented at 10 and the fence-boards at 11, of the ordinary construction.

The improved device consists in a feed-trough 12, of any approved construction, located between the posts 10, as shown, and preferably projecting at equal distances on opposite sides of the fence.

The ends of the feed-receptacle 12 are extended upward centrally, as shown at 13 14, and pivotally engaged with these upwardly-projecting ends is a movable shield or guard-plate 15, the guard-plate having depending ends 16 17 and engages the outside of the ends 13 and 14 of the receptacle. These ends are pivoted to the upper central portions of the ends 13 14 by pins 18, which are held in position by means of staples 19, by which means the guard-plate may be readily reversed in position, as will be understood.

When in one position, as in Fig. 1, the guard-plate will form an inclined closure between the fence-boards 11 and the upper edge of the feed-receptacle on one side, and when reversed in position the guard-plate will form a similar closure between the fence-boards and the opposite edge of the feed-receptacle, as shown in Fig. 2.

Fitting into the top of the receptacle is a grating formed of longitudinal bars 20 21 and spaced transverse bars 22, the longitudinal bar 21 being hinged at 23 24 to one edge of the feed-receptacle 12, as shown, so that the grating may be turned up above the feed-receptacle, as shown in Fig. 2.

Attached to the under side of the guard-plate 15, preferably near its ends and in proximity to the end pieces 16 and 17, are guide-rods 25, spaced from the guard-plate and adapted to engage loops 26, attached to the grating 20 21 22 near its free edge. The loops 26 will possess sufficient looseness of action, so that when the guard-plate 15 is operated it will carry the grating with it, the rods 25 permitting the loops to freely travel longitudinally thereof as the guard-plate is shifted, as will be understood.

The feed side of the receptacle will necessarily be the hinged side of the grating, so that when the guard-plate 15 is in the position shown in Fig. 1, with the grating in its depressed position, the feed-receptacle will be accessible to the animals through the grating. When, however, it is desired to introduce fresh feed into the receptacle, the guard-plate will be reversed, which action will shut off the feed side of the receptacle and open the opposite side and at the same time will cause the grate to assume an elevated position in close proximity to the under face of the guard-plate and the grating will be protected by the ends 16 and 17 of the guard-plate 15. In this position the outer side of the feed-receptacle will be left free and unobstructed for the ready insertion of the feed from that side. By this simple means the animals may be shut off from access to the feed until the attendant reverses the guard-plate, and the placing of the feed in the receptacle will not, therefore, be interfered with. This is a very convenient arrangement and greatly facilitates the feeding of stock and prevents waste or overfeeding, as the amount supplied may be perfectly controlled and the feeding time also perfectly controlled, as the guard-plate 15 may be retained in the position shown in Fig. 2 until the feeding time has arrived.

The different parts of the apparatus may be constructed of any desired size or capacity and of any suitable material and may be modified in minor particulars without departing from the principle of the invention or sacrificing any of its advantages.

A ring 27 may be attached to one edge of the guard-plate 15, as shown in Fig. 2, to facilitate the handling of the latter and also afford means for locking the guard-plate in either one of its two positions.

Having thus described the invention, what is claimed is—

1. A device of the class described consisting of a feed-receptacle, a guard-plate reversibly disposed with relation to said feed-receptacle, a grating extending across the entrance to the receptacle and pivotally connected to one side thereof, and means movably connecting the grating to the guard-plate, whereby said grating will be elevated to a position in close proximity to the guard-plate when the latter is reversed.

2. A device of the class described consisting of a feed-receptacle, a reversible guard-plate adapted to alternately stand adjacent opposite sides of the receptacle, a grating movably connected to one side of the receptacle, and means connecting the free end of the grating with the guard-plate whereby the said end will be alternately elevated and depressed by the operation of said guard-plate.

3. In a stock-feeder, the combination of a fence having a gap, a feed-receptacle located within said gap, a reversible guard-plate adapted to alternately engage the opposite sides of the feed-receptacle, a grating movably engaging said feed-receptacle, and means whereby said grating will be alternately elevated and depressed by the movement of said guard-plate.

4. In a stock-feeder, the combination of a fence having a gap therein, a feed-receptacle located in said gap, a guard-plate disposed longitudinally of said feed-receptacle and movably connected centrally thereto and adapted to alternately stand adjacent the opposite sides thereof, a grating engaging the entrance to said feed-receptacle and movably connected by one end thereto, and means movably connecting said grating by its other side to said guard-plate, whereby said grating will be alternately elevated and depressed by the movement of said guard-plate.

5. In a stock-feeder, a fence having a gap therein, a feed-receptacle located in said gap, a guard-plate disposed longitudinally of said feed-receptacle and having depending ends movably engaging said feed-receptacle and adapted to be rocked centrally thereon, whereby access to the sides of said feed-receptacle is alternately cut off, a grating engaging the entrance to said feed-receptacle and movably connected thereto, and means movably connecting said grating and said guard-plate, whereby said grating will be alternately elevated and depressed by the operation of said guard-plate, substantially as described.

6. In a stock-feeder, a feed-receptacle, a guard-plate disposed longitudinally of said feed-receptacle and having depending ends movably connected to said feed-receptacle, whereby said guard-plate is adapted to rock upon said feed-receptacle to alternately cut off access to the opposite sides thereof, a grating movably engaging said feed-receptacle, and means movably connecting said grating to said guard-plate, whereby said grating will be alternately elevated and depressed by the operation of said guard-plate, substantially as described.

7. In a stock-feeder, a feed-receptacle having extended ends, a guard-plate disposed longitudinally of said feed-receptacle and having depending ends movably engaging the extended ends of said feed-receptacle, whereby the guard-plate is adapted to rock above said feed-receptacle and alternately cut off access thereto from opposite sides, a grating movably engaging said feed-receptacle, and means whereby said grating will be alternately elevated and depressed by the operation of said guard-plate, substantially as described.

8. In a stock-feeder, a feed-receptacle, a guard-plate longitudinally disposed with relation to said feed-receptacle and adapted to rock thereon, whereby access to the sides of said feed-receptacle is alternately cut off, a grating engaging the entrance to said feed-receptacle and movably connected by one edge thereto, elongated loops attached to said guard-plate, and eyes attached to said grating and slidably engaging said loops, whereby the operation of said guard-plates will correspondingly elevate and depress said grating, substantially as described.

In testimony that I claim the foregoing as my own I have hereto affixed my signature in the presence of two witnesses.

JAMES J. SMITH.

Witnesses:
F. M. CLEAVES,
S. W. MURPHY.